United States Patent [19]

Hsu

[11] Patent Number: 5,842,346
[45] Date of Patent: *Dec. 1, 1998

[54] ABSORBENT CARTRIDGE FOR RELEASE MECHANISM POWERED BY CONTACT WITH FLUID

[76] Inventor: Charles J. Hsu, Box 460 Grand Central Station, New York, N.Y. 10017

[ * ] Notice: The terminal 12 months of this patent has been disclaimed.

[21] Appl. No.: 316,213

[22] Filed: Sep. 30, 1994

[51] Int. Cl.⁶ ...................................................... F03G 7/06
[52] U.S. Cl. .................................................................. 60/721
[58] Field of Search ................................ 60/721; 53/436; 15/244.4; 210/924; 264/319; 200/61.04

[56] References Cited

U.S. PATENT DOCUMENTS

| | | | |
|---|---|---|---|
| 3,280,549 | 10/1966 | Hsu | 60/721 |
| 3,562,731 | 2/1971 | Hsu | 340/604 |
| 3,745,659 | 7/1973 | Hsu | 33/720 |
| 3,951,812 | 4/1976 | Hsu | 210/282 |
| 4,419,236 | 12/1983 | Hsu | 210/282 |
| 4,890,485 | 1/1990 | Hsu | 73/61.43 |

*Primary Examiner*—Ira S. Lazarus
*Assistant Examiner*—Alfred Basichas
*Attorney, Agent, or Firm*—Leighton K. Chong

[57] ABSTRACT

A water-reacting absorbent cartridge for a release mechanism has multiple layers of water-absorbing paper material compressed into a solid, densified mass with a fraction of the original volume of the paper layers. The compacted cartridge may be wrapped in a tube of heat-shrink material with holes along its sides or may have adhesive interspersed between layers in order to keep the expansible paper layers together. Another water-reacting absorbent cartridge has multiple layers of a super absorbent material interspersed with layers of paper material compressed into a densified mass. The super absorbent material may be a powder dispersed in paper sheets, or in sheet form with paper layers interposed between. The expansible material may be contained in a jacket made of a water-permeable tightly-woven cotton fabric. Further, an oil-reacting absorbent cartridge is made of one or more layers of polyethylene molecular sponge compressed into a "hat shape" with a protruding portion on one side so that it can be seated in an oil detector unit with its expansion force concentrated through its central portion. One or more holes may be punched through the central portion to provide pathways for the oil and speed up the reaction time of the cartridge by a factor of ten.

5 Claims, 3 Drawing Sheets

5,842,346

ABSORBENT CARTRIDGE FOR RELEASE MECHANISM POWERED BY CONTACT WITH FLUID

FIELD OF THE INVENTION

This invention generally relates to an absorbent cartridge for a release mechanism which can release a physical reaction powered by contact with a fluid such as water or oil, and particularly, to an improved cartridge which has the capability to release such reaction in a short time and with a substantial amount of force.

BACKGROUND OF THE INVENTION

Fluid-reacting release mechanisms can be used in environments where it is desired to trigger and power a physical reaction, such as an expansion or pushing force, automatically upon contact with a fluid. Such a mechanism is advantageous in nautical emergencies for automatically releasing dye markers or turning on emergency lights or flashers upon contact with water. Release mechanisms are also useful in industrial environments for automatically triggering an alarm or actuating a control or recovery unit upon the detection of leaking oil or water. Such mechanisms are advantageous in that they do not require batteries that can run down or need to be periodically replaced, or have electronic sensor circuitry which may fail and cannot be readily checked for operability.

In my previous U.S. Pat. No. 3,280,549, examples of such fluid-reacting release mechanisms are shown having one or more porous pads or cartridges containing a powder, such as one made from a plant called "Sterculia lychnophora Hance", which expands upon contact with water to more than fifteen times the volume of its powdered state. The expansion of the wetted material generates a pushing force that can be used to release dye powder from a marker unit, or turn on a beacon, or actuate a nozzle of a pressurized container. My U.S. Pat. No. 3,562,731 also shows a mechanism for detecting leakage of surface fluids, such as oil or water, using an absorbent expansion pad to trigger an electric signal or alarm circuit.

In another U.S. Pat. No. 4,890,485, pads filled with an absorbent material are used to actuate a control member or signalling unit upon contact with leaking oil or water underground or in enclosed tanks. For detection of water leakage, a water-absorbing material such as the above-described plant powder is used. For detection of oil, an oil-absorbing material such as a polyethylene molecular sponge is used. Others of my patents relating to fluid-absorbent materials used for fluid detection or release mechanisms include U.S. Pat. Nos. 3,562,731, 3,745,659, 3,951,812, and 4,419,236. It is intended that all of the foregoing patents are incorporated herein by reference.

It is now desired to improve upon such prior release mechanisms by providing absorbent cartridges that are more compact, are less costly, react in shorter times, and expand with greater force than the previous mechanisms.

SUMMARY OF THE INVENTION

In one embodiment of the present invention, a water-reacting absorbent cartridge for a release mechanism is comprised of multiple layers of water-absorbing paper material which are compressed by a high compression force into a solid, densified mass having a volume that is a small fraction of the original volume of the multiple paper layers. To keep the expanding paper layers from separating apart during use, the compacted cartridge may be wrapped in a tube of an elastic material having holes all along its side walls for passage of fluid therethrough. Alternatively, an adhesive may be interspersed between the paper layers to hold the expanding paper layers together.

In another embodiment, a water-reacting absorbent cartridge for a release mechanism is comprised of multiple layers of a super absorbent material interspersed with layers of paper material which are compressed by a high compression force into a solid, densified mass having a fractional volume of the original layers. The super absorbent material may be absorbent fibers in sheet form or a synthetic powder carried in a sheet matrix of paper fibers, with layers of tissue or blotter paper interposed therebetween. As a further variation, the expansible material may be contained within one or more envelopes of a water-permeable tightly-woven cotton fabric for containing the expanding material during use.

In a further embodiment, an oil-reacting absorbent cartridge for a release mechanism is comprised of one or more layers of an oil-absorbent material which is compressed by a high compression force into a compact unit having a "hat shape" with a flat base or rim and a protruding portion on one side to allow the cartridge to be seated compactly in an oil detector unit while concentrating the expansion force through the central portion of the unit. One or more holes may be pierced through the central portion of the cartridge to provide pathways for oil to reach the compressed absorbent material, and thereby speed up the reaction time of the expanding material.

The compression of the water-absorbent paper and super absorbent layers into a densified mass allows the release cartridge to have a small size when installed in a release mechanism and to be made less costly. Upon contact with the selected fluid, the cartridge expands to a volume many times larger than its compressed size, thereby generating an expansion volume or force many times greater than its installed size. The compression of the oil-absorbent material into a hat shape concentrates a greater amount of absorbent mass in the region being monitored. The provision of fluid transport channels, pathways, or holes through the absorbent material greatly speeds up the reaction time of the cartridge for releasing the desired response.

Further objects, features and advantages of the present invention are described in detail below in conjunction with the drawings, as follows:

DETAILED DESCRIPTION OF THE INVENTION

Figure 1A:
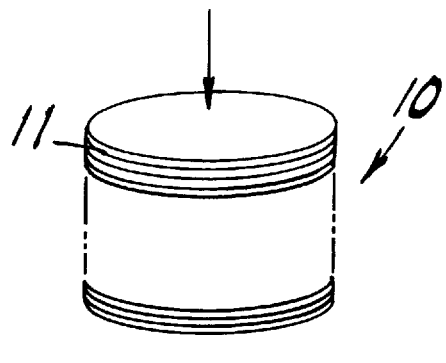
FIGS. 1a and 1b illustrate the compression of multiple paper layers to form a water-reacting absorbent cartridge for a release mechanism in accordance with the present invention.

Referring to FIG. 1a, one embodiment of the present invention is a water-reacting absorbent cartridge 10 for a release mechanism comprised of multiple layers 11 of water-absorbing paper material. The paper material may be of any suitable type such as tissue paper, blotter paper, porous drawing paper, etc. A high compression force is used to compress the paper layers into a solid, densified mass that has a volume that is a fraction of the volume of the original layers. The compression force is chosen to be sufficient to compress out all of the air space or lofted space between and among the fibers of the paper layers. This can be anywhere in the range from a fraction of a ton of compression weight to 70 tons or higher, depending on the number of paper layers and the compactness (density) of the cartridge material that can be obtained without compromising a timely release function.

The number of paper layers is chosen according to the expansion volume and force required for a particular application. For example, for use as a trigger to push a pin to pierce a $CO_2$ cartridge to inflate an object, such as a life vest or raft, the cartridge may be made of 30 to 50 or even 100 layers of paper, having an original height of about 2" to 5". For use in driving a mechanical indicator, such as for water detection in a quench tank as shown in U.S. Pat. No. 4,890,485, well over 100 to 300 or more paper layers can be used. The paper layers can be compressed with a force of 10 to 50 tons or more so that the resulting height of the cartridge is about one-tenth or less of the original height, i.e., about 0.125" to 0.50". On the other hand, for use as a trigger for a water-detecting sensor circuit, in which only a slight force of about a few ounces pressure and a small amount of expansion height are required, the cartridge can be made of 10 or as few as 5 layers of paper and compressed with a compression force of a fraction of a ton to a few tons. Compression apparatus and presses of various types are widely known and may be used here in any suitable fashion.

Figure 1B:
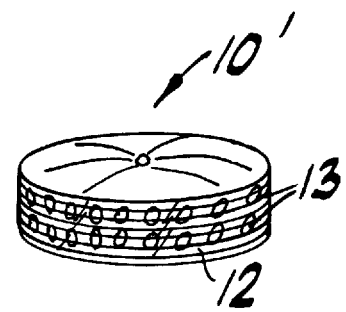

To keep the expanding paper layers from separating apart during use, the paper layers of the cartridge may be kept together by any suitable means. For example, as shown in FIG. 1b, the compacted cartridge 10' may be wrapped in a tube 12 of an elastic material having holes 13 all along its side walls for passage of fluid therethrough. A suitable elastic material is "heat-shrink" plastic. Alternatively, an adhesive, such as glue, rubber cement, or hot-melt adhesive may be interspersed between the paper layers to hold the expanding paper layers together.

Figure 2A:
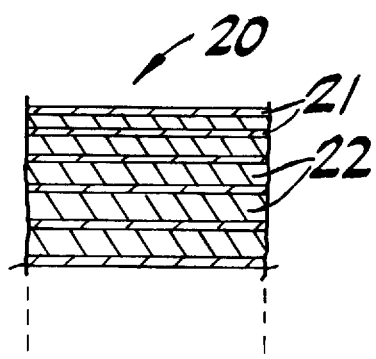
FIGS. 2a, 2b, 2c, and 2d illustrate a release cartridge made by compressing super absorbent sheets interspersed with paper layers contained within one or more envelopes of cotton fabric.

Another embodiment of a water-reacting absorbent cartridge is shown in FIG. 2a. Here the release mechanism 20 is comprised of multiple layers 22 of super absorbent material with layers 21 of tissue, blotter, or other suitable paper interposed between the super absorbent layers. Super absorbents include a wide range of materials that have the capacity to absorb a large volume of fluid per unit weight, e.g., highly cross-linked cellulosic fibers, hydrophilic treated fibers, etc. Such materials are widely available in sheet form as stock materials for various types of absorbent consumer products, for example, sheets sold under the trade designation Super Absorbent Laminate, available from Gelok International Co., of Dunbridge, Ohio. Super absorbent sheets can also be made with synthetic powder material, such as disclosed in U.S. Pat. No. 4,045,387, carried in a sheet matrix of paper fibers. For example, such super absorbent paper can be obtained under the trade designation "SanWet SAP Sheet 4000-S", from Sanyo Chemical Industries, of Kyoto, Japan. This invention can use any suitable super absorbent sheet materials as they are developed and improved.

Figure 2B:
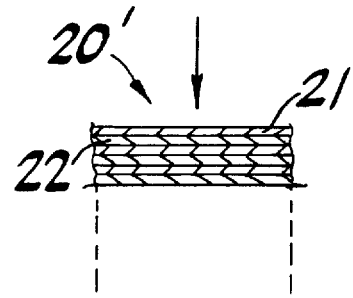

As shown in FIG. 2b, the multiple layers of super absorbent material interspersed with paper layers are compressed into a compact unit 20' as previously described. The compression force, number of layers, and height of the compacted unit will be chosen depending upon the application for which the cartridges are to be used. An important aspect of this embodiment of the invention is that the interspersed paper layers serve as channels or pathways for wicking water throughout all the interior parts of the layers to reach the super absorbent material in a widespread fashion. This ensures that water is quickly taken up widely throughout the cartridge, so that a physical reaction of expansion can be produced within a shorter time of the order of 5–10 times faster. For comparison, release cartridges made of super absorbent material interspersed with paper layers can reach full expansion in a short time of the order of 10 seconds to 1–2 minutes, whereas comparable cartridges made of compressed super absorbent sheets only or compressed super absorbent powder only might take several minutes to fifteen minutes to reach full expansion. The use of compressed super absorbent material and paper layers is also less costly than using all super absorbent material or the plant starch described in U.S. Pat. No. 3,280,549.

Figure 2C:
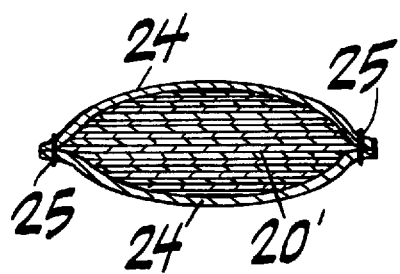

When the compacted paper layers or the super absorbent material absorbs water, it turns into an expanded slurry or gelatinous mass. Containment of the mass is required to maintain the release cartridge as an integral body and concentrate its expansion force. As illustrated in FIG. 2c, a particularly good containment for the compacted paper unit 10' or the super absorbent unit 20' is a pouch or jacket of cotton fabric 24 having a very tight weave which is sewn or sealed at its peripheral ends 25. The cotton fibers of the fabric are easily wetted and will draw water to the expansion material within, and the tight weave prevents the expanding mass from escaping. A particularly good fabric for this purpose is commercially available from fabric suppliers as "Swiss Cotton (2×2 Type)".

Figure 2D:
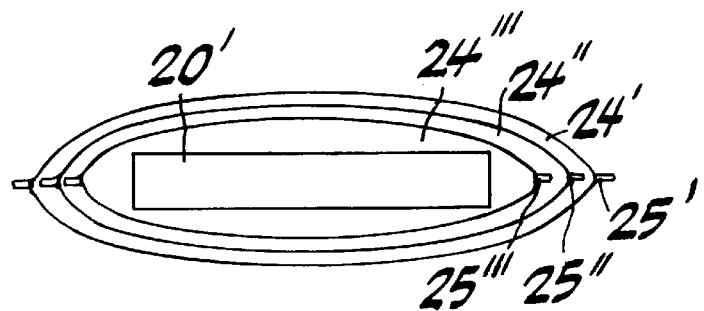

The water-permeable containment pouch serves to prevent the expansion material from escaping and the expansion force from dissipating. The release cartridge can also be readily removed and replaced. More than one fabric layer may be used for increased strength. FIG. 2d illustrates a version having three envelopes of cotton fabric in nested form. The nested envelopes ensure that the absorbent material remains contained even if it bursts through the first or second layers.

Figure 3:
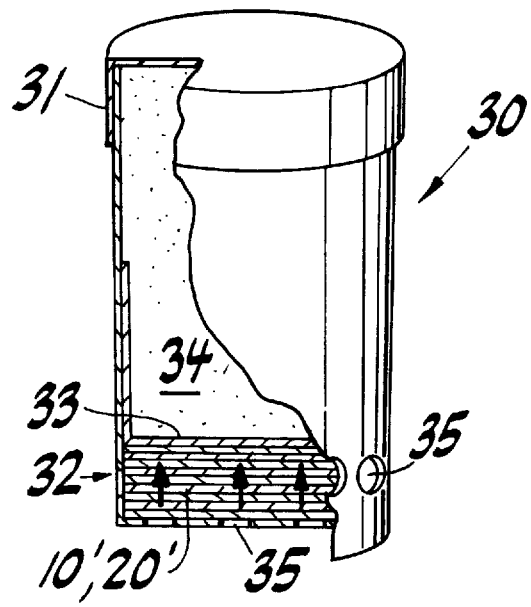
FIG. 3 shows the water-reacting absorbent cartridge as used in a dye marker mechanism.

In FIG. 3, an example of a dye marker container 30 using the water-reacting release cartridge 10' or 20' is shown. The release cartridge is installed in a lower compartment 32 behind a moveable piston wall 33 separating it from an upper compartment 34 containing powdered dye material. The container has a lid 31 that can be forced off under pressure of a few pounds force. When the container is dropped in the water, holes 35 admit water into the lower compartment 32 where it is taken up by the absorbent material of the release cartridge. The wetted material expands and generates an expansion force (indicated by arrows) that forces the lid 31 open and disperses the dye material into the water. As a specific example, a cartridge of 25–30 super absorbent and interspersed paper layers compressed with 14 tons of compression force can generate a strong force of several pounds of pressure and expands quickly within about 10–20 seconds, thereby making it suitable for this purpose as well as a wide range of other applications in which such a physical reaction is required upon contact with water.

Figure 4:
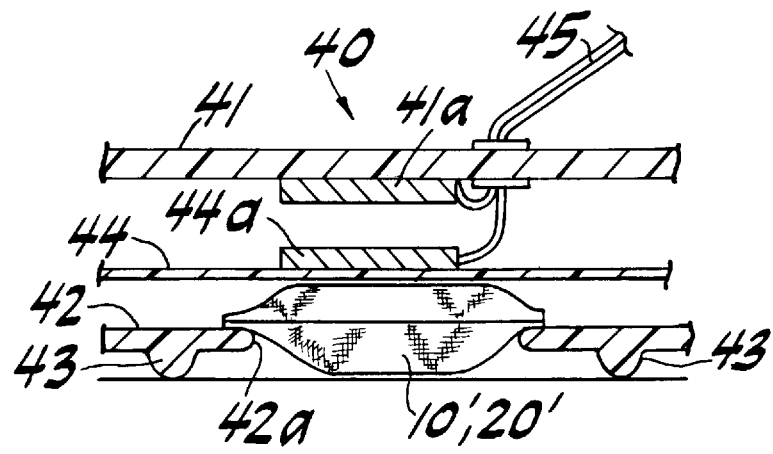
FIG. 4 shows the water-reacting absorbent cartridge as used in a water detector mechanism.

In FIG. 4, an example of a water detector unit 40 using the water-reacting release cartridge 10' or 20' is shown. The detector unit has an upper wall 41 and a lower wall 42 made of insulative material. The lower wall 42 has projections 43 which support it a given height above a floor surface. The upper wall 41 has a metal contact pad 41*a* mounted on its lower surface. A thin, flexible wall 44 is spaced between the upper and lower walls and has another contact pad 44*a* mounted on its upper surface spaced apart from the contact pad 41*a* by a small gap. The contact pads are electrically coupled to respective wires 45 which extend from the detector unit 40 to an external switch or control module. A release cartridge 10' or 20' is installed in the lower space between the flexible wall 44 and the lower wall 42 with a portion projecting through an aperture 42*a* in the lower wall downwardly toward the floor surface. The flexible wall 44 is configured so as to be bendable toward the upper wall by a small force of a few ounces of pressure so as to bring the contact pads into electrical contact with each other. In the event of a leakage of water onto the floor surface, the water is taken up by the protruding portion of the release cartridge 10' or 20'. The wetted expansion material expands and pushes the contact pads together, thereby closing a circuit in the external switch or control module. In this application, a cartridge of 5–10 super absorbent and interspersed paper layers compressed with 14 tons of compression force can generate a force of up to about a pound of pressure quickly within about 10–20 seconds.

Figure 5A:
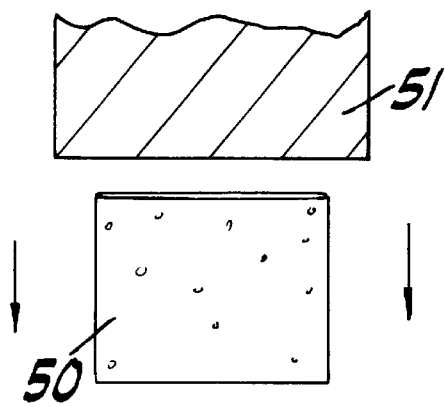
FIGS. 5a and 5b illustrate the forming of a "hat-shaped" polyethylene molecular sponge for an oil-reacting absorbent cartridge.
Figure 5B:
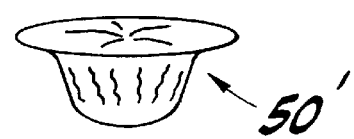
Figure 5C:
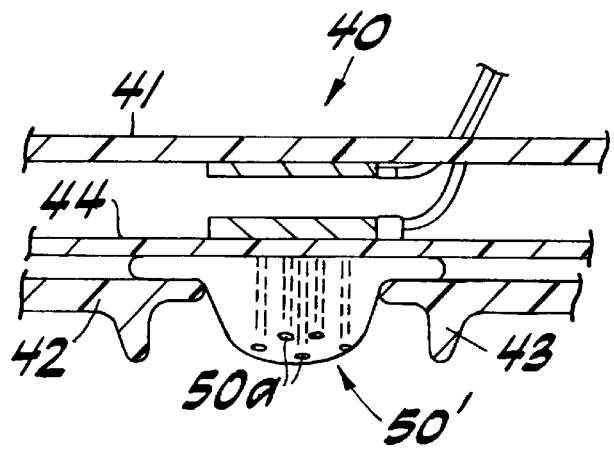
FIG. 5c shows the cartridge provided with pierced through-holes for use in a quick acting oil sensor.

The present invention includes certain improvements for an absorbent cartridge which reacts only to contact with oil as the fluid, shown in the further embodiments in FIGS. 5*a*–5*c*. As disclosed in my previous U.S. Pat. No. 4,890,485, a particularly good oil-absorbent material is a polyethylene molecular ("PM") sponge which will absorb only oil and will not react to water and other fluids. Such PM sponges are sold, for example, under the trade designation "Sentinel Quick-Sorb Oil and Gas Wipes" from Sentinel Fitness Products, of Hyannis, Mass. The sponge material can be selected to distinguish even between light volatile oil and more viscous oils.

In my previous oil-reacting mechanism, one or more sponges are compressed into a flattened disk shape to form a release cartridge. However, I have found that the reaction time can be shortened and the expansion force concentrated by compressing the PM sponge(s) into a hat-shape in which one side protrudes in the direction where it will contact or detect oil. As shown in FIG. 5*a*, the PM sponge 50 is compressed between an upper anvil 51 having a flat anvil surface and a lower anvil 52 having surface provided with a central recess 52*a*. The compression force can be anywhere in the range of a few tons to 50 tons of pressure, and preferably 12 to 14 tons. More than one sponge may be stacked in a column and compressed together. The use of multiple sponge layers can enhance the reaction time of the cartridge for fluid absorption. The sponge material becomes compressed into a solid, densified mass. The compressed material becomes forced into the recess 52*a,* thereby resulting in the hat shape unit 50' shown in FIG. 5*b* having a flat rim and a central protruding portion on one side.

The hat-shaped unit 50' can be installed in an oil-detector unit 40 illustrated in FIG. 5*c,* which is similar to the unit shown in FIG. 4, with its flat side mounted against the flexible contact-pad wall and its protruding portion extending toward the floor surface to be monitored for oil leakage. The protruding portion has a greater mass or material and increased surface area present in the fluid contact region, and the absorption of oil will result in a concentration of the expansion force through the center portion of the release cartridge. The detector unit can also be made with a slimmer profile because the flat portion mounted within is thinner.

As shown in FIG. 5*c,* the hat-shaped unit 50" can be further improved by piercing one or more holes 50*a* through the center protruding portion (shown in dashed lines) to provide pathways for the oil to be taken directly into the interior of the mass of material, rather than contacting only from the outside surface inward. For comparison, it is found that the hat-shaped unit 50' without holes can take up to 30 minutes to fully expand, whereas the unit 50" with 5 holes punched through will fully expand within a minute or two. This represents an increase in the speed of reaction by a factor of at least ten. The number of holes is chosen depending upon the sensitivity (amount of oil to trigger a detection output) of the detector and the speed of reaction time desired.

Although the invention has been described with reference to certain preferred embodiments, it will be appreciated that many other variations and modifications thereof may be devised in accordance with the principles disclosed herein. It is intended that the invention, including the described embodiments and all variations and modifications thereof, be encompassed within the scope of the following claims.

I claim:

1. An oil-reacting absorbent cartridge for a release mechanism in combination with an oil detector mechanism having retaining means including an abutting wall for retaining an absorbent cartridge therein, exposing means including an aperture in the abutting wall for exposing the absorbent cartridge to the presence of oil in an oil-detection region, and alarm activating means for activating an alarm upon reaction of the absorbent cartridge to the presence of oil, said oil-reacting absorbent cartridge comprising:

one or more layers of an oil-absorbent material compressed by a high compression force into a compact unit having a hat shape with a flat annular base and a central protruding portion projecting a given distance from the flat base in one direction perpendicular to a plane defined by the flat base;

wherein said flat base has a radial spacing from said central protruding portion and a thickness so as to allow the flat base to be retained by the abutting wall of the retaining means in a stationary position within the detector mechanism with its central protruding portion projecting through the aperture of the exposing means of the detector mechanism into an oil-detection region; and wherein said flat base has a flat side opposite from the one side thereof from which the protruding portion projects, said flat side being placed flat in physical contact against the alarm activating means of the detector mechanism.

2. An oil-reacting absorbent cartridge according to claim 1, wherein the cartridge has one or more holes pierced extending in the perpendicular direction through the central protruding portion to the flat side of the flat base to provide pathways for oil to reach through the compressed absorbent material.

3. An oil-reacting absorbent cartridge according to claim 2, wherein the cartridge has five or more of such pierced holes and the speed of reaction time for the cartridge is increased by a factor of at least ten.

4. An oil-reacting absorbent cartridge according to claim 1, wherein the oil-absorbent material is a polyethylene molecular sponge.

5. An oil-reacting absorbent cartridge according to claim 4, wherein the sponge is compressed by a compression force in the range of a few tons to more than 50 tons per square inch or more of pressure.

\* \* \* \* \*